US012619225B2

(12) United States Patent
Su et al.

(10) Patent No.: US 12,619,225 B2
(45) Date of Patent: May 5, 2026

(54) MEMORY AND COMPUTE-EFFICIENT UNSUPERVISED ANOMALY DETECTION FOR INTELLIGENT EDGE PROCESSING

(71) Applicant: Intel Corporation, Santa Clara, CA (US)

(72) Inventors: Fei Su, Ann Arbor, MI (US); Rita Chattopadhyay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/747,479

(22) Filed: May 18, 2022

(65) Prior Publication Data

US 2022/0365523 A1 Nov. 17, 2022

(51) Int. Cl.
*G05B 23/02* (2006.01)
*G06F 18/243* (2023.01)

(52) U.S. Cl.
CPC ... *G05B 23/0254* (2013.01); *G06F 18/24323* (2023.01)

(58) Field of Classification Search
CPC ........... G05B 23/0254; G06F 18/24323; G06F 18/2433; G06N 5/01; G06N 20/20
See application file for complete search history.

(56) References Cited

U.S. PATENT DOCUMENTS

| | | | |
|---|---|---|---|
| 10,685,081 B2 | 6/2020 | Chattopadhyay et al. | |
| 11,526,838 B1 * | 12/2022 | Sethuraman ....... | G06Q 10/0836 |

| | | | | |
|---|---|---|---|---|
| 2019/0243811 A1 * | 8/2019 | Asai | .......................... | G06N 5/01 |
| 2020/0311559 A1 * | 10/2020 | Chattopadhyay | ........ | G06N 5/01 |
| 2020/0366699 A1 * | 11/2020 | Sampaio | ........... | G06F 16/24568 |
| 2022/0284307 A1 * | 9/2022 | McQueary, III | ......... | G06N 5/04 |
| 2023/0186109 A1 * | 6/2023 | Martins | .................... | G06N 5/02 |
| | | | | 706/12 |

OTHER PUBLICATIONS

Lin et al. (Towards Efficient and Scalable Acceleration of Online Decision Tree Learning on FPGA, 2020) (Year: 2020).*
Chandra et al. , A new node splitting measure for decision tree construction, 2010 (Year: 2010).*
Zhe Lin et el. , Hard-ODT: Hardware-Friendly Online Decision Tree Learning Algorithm and System, IEEE 2012 (Year: 2012).*
Lin et al. Towards Efficient and Scalable Acceleration of Online Decision Tree Learning on FPGA (Year: 2009).*

* cited by examiner

*Primary Examiner* — Mohammad K Islam

(74) *Attorney, Agent, or Firm* — Nicholson De Vos Webster & Elliott LLP

(57) ABSTRACT

Systems, apparatuses, and methods include technology that identifies a first dataset that comprises a plurality of data values, and partitions the first dataset into a plurality of bins to generate a second dataset, where the second dataset is a compressed version of the first dataset. The technology randomly subsamples data associated with the first dataset to obtain groups of randomly subsampled data, and generates a plurality of decision tree models during an unsupervised learning process based on the groups of randomly subsampled data and the second dataset.

21 Claims, 8 Drawing Sheets

<u>186</u>

Logic 182

Substrate(s) 184

320

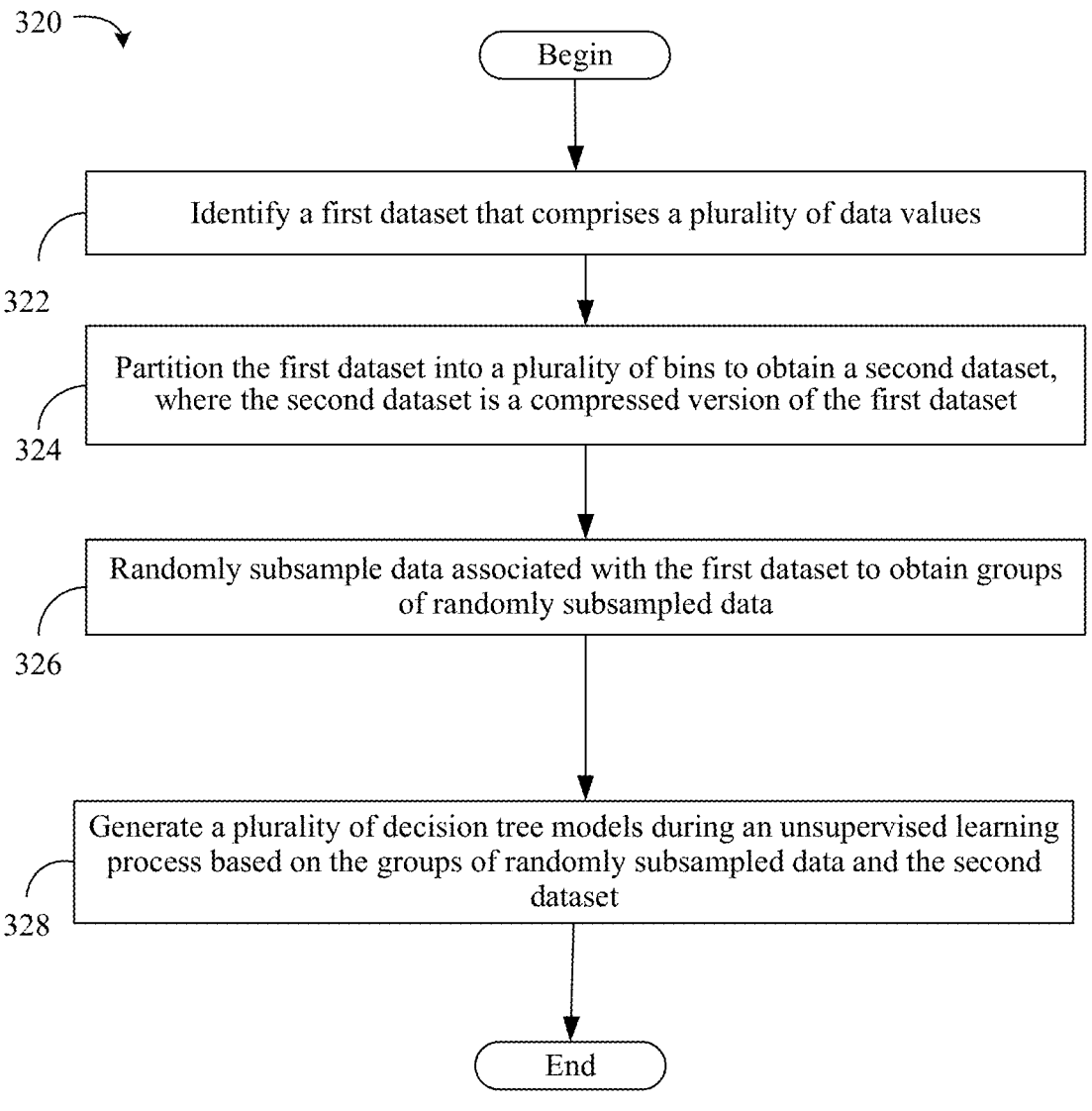

Begin

Identify a first dataset that comprises a plurality of data values

322

Partition the first dataset into a plurality of bins to obtain a second dataset, where the second dataset is a compressed version of the first dataset

324

Randomly subsample data associated with the first dataset to obtain groups of randomly subsampled data

326

Generate a plurality of decision tree models during an unsupervised learning process based on the groups of randomly subsampled data and the second dataset

328

End

FIG. 3

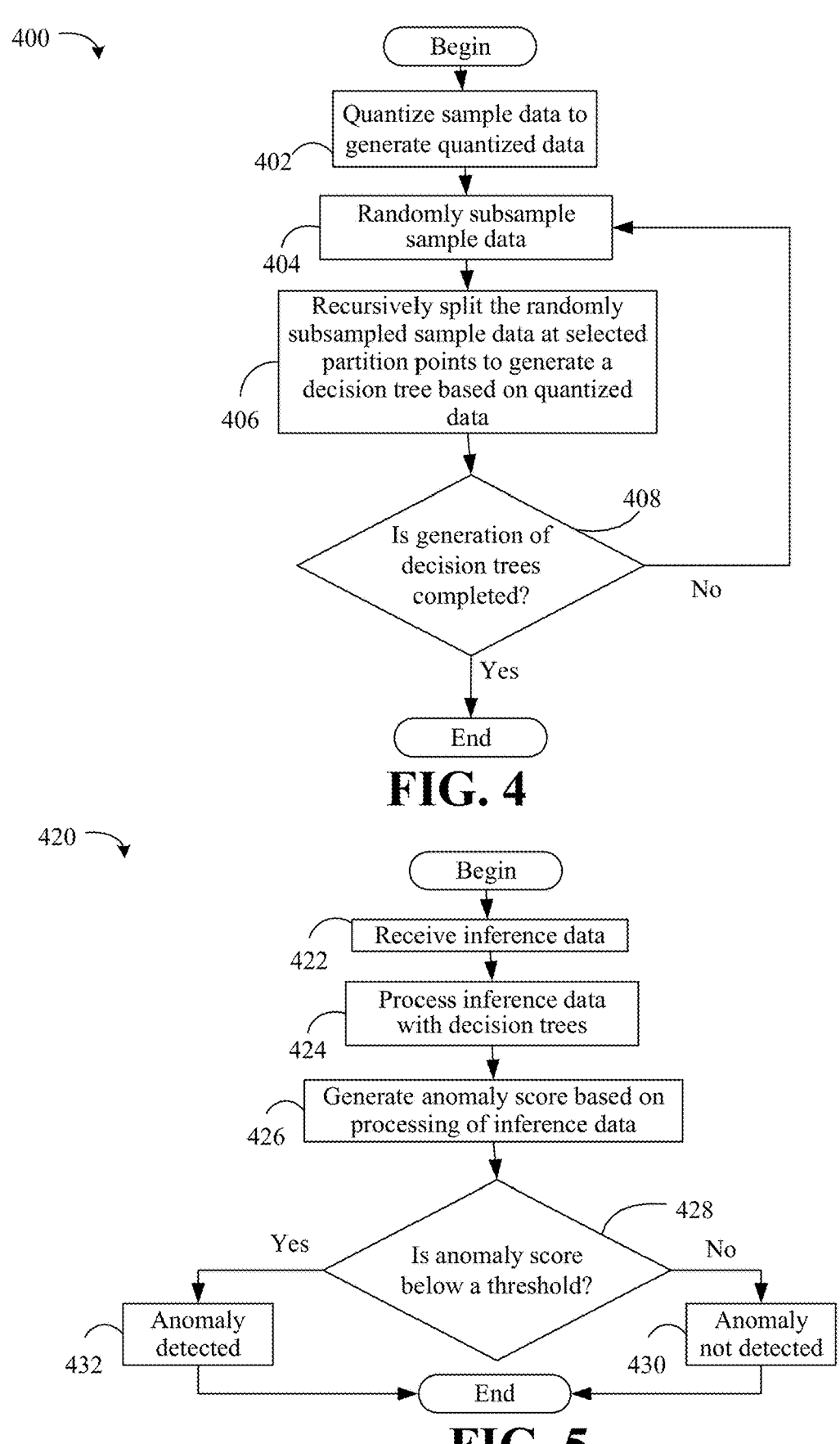

400

Begin

402 Quantize sample data to generate quantized data

404 Randomly subsample sample data

406 Recursively split the randomly subsampled sample data at selected partition points to generate a decision tree based on quantized data 408 Is generation of decision trees completed?

No

Yes

End

Begin

422 Receive inference data

424 Process inference data with decision trees

426 Generate anomaly score based on processing of inference data

428 Is anomaly score below a threshold?

Yes

No

432 Anomaly detected

430 Anomaly not detected

End

FIG. 5

MEMORY AND COMPUTE-EFFICIENT UNSUPERVISED ANOMALY DETECTION FOR INTELLIGENT EDGE PROCESSING

TECHNICAL FIELD

Embodiments generally relate to anomaly detection. More particularly, embodiments relate to optimal data quantization to generate an ensemble of random decision trees for anomaly detection, and anomaly inference with the random decision trees.

BACKGROUND

Anomaly detection is used in a variety of fields to detect atypical behavior. Atypical behavior of a system may indicate that the system is potentially failing and/or executing in a sub-optimal state. Anomaly detection may consume significant compute and memory resources. Thus, certain devices may be unable to implement anomaly detection resulting in reduced efficiency and higher failure rates. Furthermore, anomaly detection may be challenging to implement with neural networks due to the varied types of anomalies and the lack of labeled datasets available for training.

BRIEF DESCRIPTION OF THE DRAWINGS

The various advantages of the embodiments will become apparent to one skilled in the art by reading the following specification and appended claims, and by referencing the following drawings, in which:

FIG. 3 is a flowchart of an example of a method of training a plurality of decision tree models processing according to an embodiment;

FIG. 4 is a flowchart of an example of a method of generating decision trees processing according to an embodiment;

FIG. 5 is a flowchart of an example of a method of executing inference with a plurality of decision trees processing according to an embodiment;

DESCRIPTION OF EMBODIMENTS

Figure 1A:
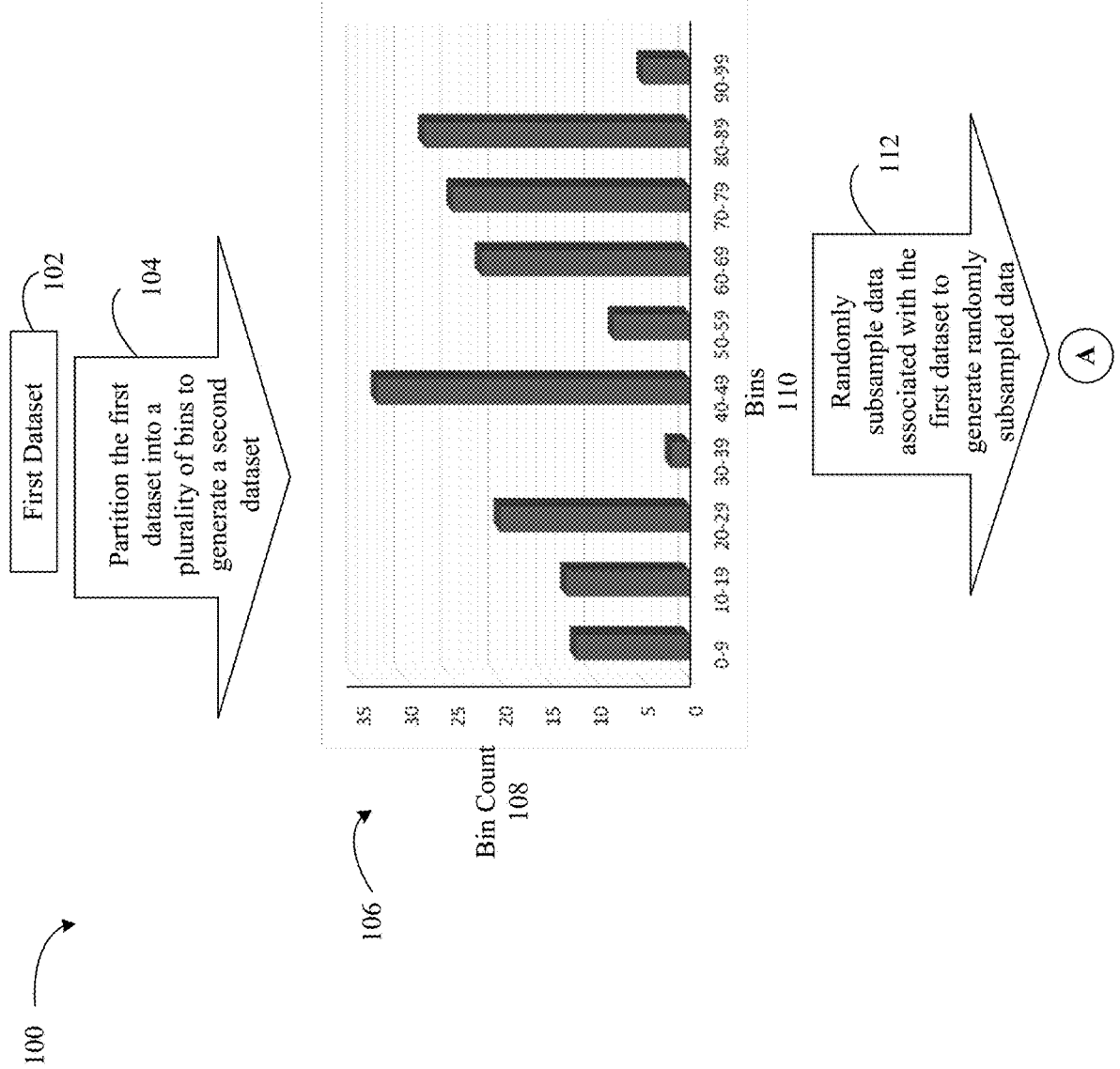
FIGS. 1A and 1B are a process of an example of an unsupervised anomaly detection training process according to an embodiment.
Figure 1B:
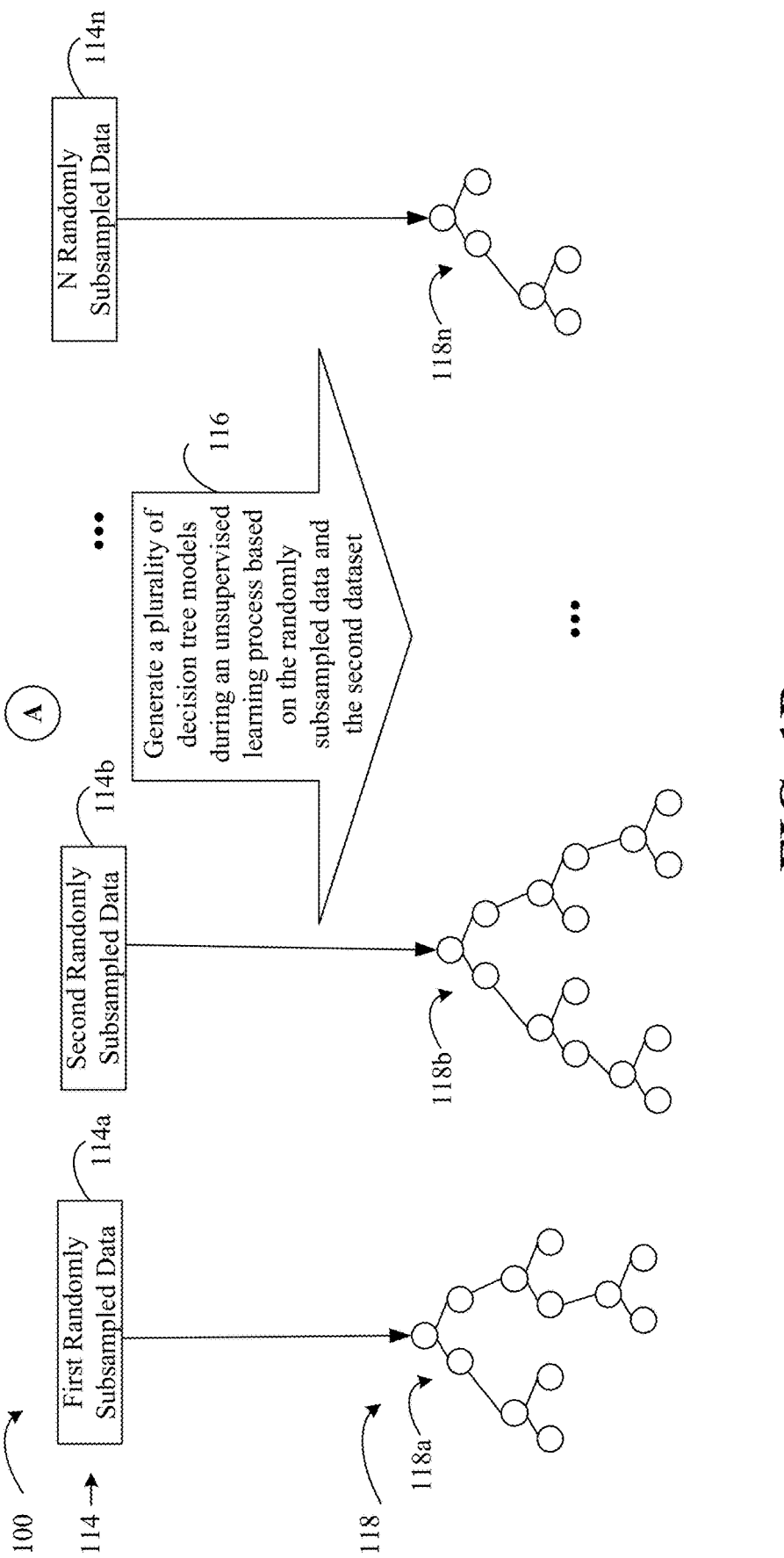

Turning now to FIGS. 1A and 1B, embodiments herein relate to an unsupervised anomaly detection training process 100 (e.g., machine learning without labeled data) that is optimized for memory and compute efficiency. As such, the unsupervised anomaly detection training process 100 may execute in resource constrained devices (e.g., edge devices) that previously may have been unable to execute unsupervised training in a practical manner. Embodiments include an application of an optimal data quantization to an ensemble of random decision trees for anomaly detection, thus highly reducing the training samples (i.e., search space) and achieving anomaly detection performance with a more efficient (e.g., leaner and smaller) model than other designs. Thus, embodiments combine decision tree based ensemble learning and the optimal data quantization to generate an efficient memory and compute-efficient anomaly detector.

Initially in FIG. 1A, a first dataset 102 is provided. The first dataset 102 may comprise features associated with one or more objects. The objects may be varied (e.g., system, computer program, vehicle, etc.). The features may be measurable properties of the object. The features may have different values and are associated with anomaly detection (e.g., certain values of the features indicate an anomaly). In some examples, the first dataset 102 may comprises different values of the feature over a period of time. Examples of the first dataset 102 include process values associated with physical machinery such as temperature, pressure, humidity, air or water flow rate etc. (e.g., the process values) measured over a period of time to monitor health of fan, pump or a compressor (e.g., the physical machinery). These features may have a certain value under normal operation and one or all may change under any anomaly or failure.

The unsupervised anomaly detection training process 100 includes an optimal data quantization technique that is applied to preprocess the data (on all feature dimensions). That is, the process 100 partitions the first dataset 102 into a plurality of bins to generate a second dataset 104.

For example, the process 100 executes data discretization. In the illustrated example, a second dataset 106 (e.g., a histogram) is created for the first dataset 102 by performing data discretization using an identified bin size of 10. The bin size is an adjustable feature which may be adjusted for different types of data and based on various criteria. The first dataset 102 is an array of numerical data, which contains 168 total data elements with values ranging between 0 and 99. The entire range of values of the first dataset 102 (from 0 to 99) is broken down into intervals of 10, and each interval is represented by a separate bin, resulting in a total of 10 bins. The data elements of first dataset 102 are then grouped into an appropriate bin, and the number of data elements in each bin are counted (e.g., a bin count value). For example, bin 40-49 has a bin count value of 33 which means that bin 40-49 has 33 data elements. The second dataset 106 is thus used to represent the number of data elements in each bin. In the illustrated example, the y-axis of histogram represents bin count 108 (e.g., the number of data elements in a bin or bin count values), and the x-axis represents the various bins 110.

Thus, the first dataset 102 is data binned, by converting or partitioning a range of continuous raw data of the first dataset 102 into a smaller number of bins that each represent a particular interval or range, and then maintaining only the bin counts, or the number of data elements in each bin. In this manner, the first dataset 102 (e.g., raw data values) are aggregated and the size of the dataset is reduced or compressed. Accordingly, in the illustrated embodiment, process 100 performs data binning to reduce the size and/or compress the first dataset 102 into the second dataset 106 (e.g., a binned dataset) represented by the second dataset 106. Doing so reduces the search space and may facilitate identification of inflection points for partitioning the random decision trees (discussed below).

The process 100 then randomly subsamples data associated with the first dataset 102 to generate randomly subsampled data 114, 112. Turning to FIG. 1B, different sets of randomly subsampled data 114 are illustrated. The first dataset 102 may be sub-sampled randomly without the need of labels to generate randomly subsampled data 114 which in turn will form the basis of the decision tree models 118. Due to the random sampling, each of the first randomly subsampled data 114*a*-N randomly subsampled data 114*n* comprise different samples from each other. For example, the first randomly subsampled data 114*a* may include values 4, 32, 91 and 72 from the first dataset 102, which correspond to bin count values for bins 0-9, 30-39, 90-99 and 70-79 of the second dataset 106, with the bin count values being stored in association with bins 0-9, 30-39, 90-99 and 70-79. The second randomly subsampled data 114*b* may include values 11, 41 and 82 from the first dataset 102, which correspond to bin count values for bins 10-19, 40-49 and 80-89, with the bin count values being stored in association with bins 10-19, 40-49 and 80-89. The N randomly subsampled data 114*n* may include values 22, 51 and 71 from the first dataset 102, which correspond to bin count values for bins 20-29, 50-59 and 70-79, with the bin count values being stored in association with bins 20-29, 50-59 and 70-79. In some examples, some amount of data overlap is permitted between the different sets of randomly subsampled data 114.

To perform unsupervised anomaly detection, the process 100 generates a plurality of decision tree models 118 during an unsupervised learning process based on the different sets of randomly subsampled data 114 and the second dataset 106, 116. For example, each of the different sets of randomly subsampled data 114 may form the basis of a different one of the decision tree models 118. In this example, a first decision tree model 118*a* is generated based on the first randomly subsampled data 114*a*, a second decision tree model 118*b* is generated based on the second randomly subsampled data 114*b*, the N decision tree model 118*n* is generated based on the N randomly subsampled data 114*n*, etc.

Some examples may randomly select split points for the first-N decision tree models 118*a*-118*n* from previously quantized values of the selected feature as identified from the second dataset 106. The sub-sampled data is recursively split at a randomly selected partition point in the randomly selected feature until each data instance is fully isolated. For example, the first decision tree model 118*a* may be generated based on the values 4, 32, 91 and 72 and data intensities for bins 0-9, 30-39, 90-99 and 70-79. Different nodes (e.g., leaf node and root node) and may be generated based on the data. For example, a series of nodes may be generated based on the data intensities for the bins 0-9, 30-39, 90-99 and 70-79 by identifying a hierarchical structure of the series of nodes based on the data intensities. Values associated with lower bin counts (lower bin intensities) will be placed higher (earlier) in the first decision tree model 118*a*. The nodes may determine whether a value is equal to, less than or greater than the values 4, 32, 91 and 72. As an example, an inference process may be executed with the first decision tree model 118*a* such that a first node (e.g., a root node) may determine whether an inference value (which may be provided during inference) is equal to 32, greater than or equal to 32, or less than 32. If the inference value is equal to 32, a match is found and the corresponding first node ID is returned. During the partitioning of the first dataset 102 into the plurality of bins to generate the second dataset 106, 104, the value 32 is sorted into bin 30-39 which has the lowest bin count.

If the inference value is less than 32, the inference value may be evaluated by a second node (e.g., a node corresponding to the value 4) which is a child of the first node. During the partitioning of the first dataset 102 into the plurality of bins to generate the second dataset 106, 104, the value 4 is sorted into bin 0-9 which has the third lowest bin count. The second node may determine whether the inference value is equal to 4, less than 4 or equal to 4. If the inference value is equal to 4, the corresponding second node ID is returned. Otherwise, a corresponding indication of whether the inference value is greater than 4 or less than 4 is returned.

If at the first node, the inference value is greater than 32, a third node (which is a child of the first node) may determine whether the inference value is greater than 91, equal to 91 or less than 91, and provide the value to a corresponding child node based on the outcome. During the partitioning of the first dataset into the plurality of bins to generate the second dataset 106, 104, the value 91 is sorted into bin 90-99 which has the second lowest bin count. If the inference value is less than 91, a fourth node may determine whether the inference value is equal to 71, less than or greater than 71. During the partitioning of the first dataset into the plurality of bins to generate the second dataset 106, 104, the value 71 is sorted into bin 70-79 which has the highest bin count. The inference process may continue to be processed by nodes of the first decision tree model 118*a* until the inference value is classified by the first decision tree model 118*a*. The above inference process is the process by which a test data would traverse a tree which is built during training time.

In some embodiments, rather than randomly selecting split points, to enhance memory and compute efficiency in edge computing usage cases, embodiments deploy an innovative way to select split points (which may correspond to nodes) during decision tree construction. This is an enhancement over other designs where the split point value is uniformly sampled between the min and max of data samples in the selected feature.

For example, some embodiments leverage the bin count information provided in the second dataset 106 and obtained from the data quantization process to guide the split point selection in a more efficient manner. From an anomaly detection perspective, embodiments efficiently select a split point such that the anomaly data may be isolated much earlier in the decision tree models 118 (e.g., each tree) than the normal data is isolated. A characteristic of an anomaly is "less and different." That is, regions with relatively high data density mostly contains normal data rather than anomalies. As such, to facilitate expedient anomaly detection with reduced power and resource consumption, embodiments select split points based on regions with relatively low data density (e.g., sparse regions associated with lower bin count values) to appear at a lower depth in the decision tree models 118.

Based on the above, embodiments select a subset of the quantized value based on a ranking of data intensity. The data intensity is approximated by bin count data of the second dataset 106. As a more detailed example, consider that the first decision tree model 118*a* *may be generated based on the values* 4, 32, 91 and 72 from the first dataset 102 and data for bins 0-9, 30-39, 90-99 and 70-79. Thus, a first split point (e.g., a root node) may be selected based on data intensities from the bins 0-9, 30-49, 90-99 and 70-79 with the lowest bin value. The values associated with the lowest bin counts are selected to appear earlier in the first decision tree model 118*a* than values associated with higher bin counts. The bin of the bins 0-9, 30-39, 90-99 and 70-79 with the lowest bin value is the bin 30-39 with a bin count value of 2 (e.g., bin for 30-39 has two data elements). Thus, the first split point is generated based on the bin 30-39 to select the value 32 as the first split node (root node). A second split point (e.g., corresponding to the third node discussed above and a child of the root node) may be based on data intensities of the bins 0-9, 90-99 and 70-79 with the lowest bin value which is bin 90-99 with a bin count value of 5. The second split point may be based on the value 91. A third split point (which corresponds to the second node discussed above) may be based on data intensities from the bins 0-9 and 70-79 with the lowest bin value, which is bin 0-9 with a bin count value of 12. Thus, the third split point may be based on the value 4. A fourth split point (the fourth node discussed which is a child of the third node) may be determined based on the data intensity of bin 70-79 which 114b-the N randomly subsampled data 114n that are sorted into bins with low data intensities (e.g., a small amount of elements) and placed into the second decision tree model 118b-N decision tree model 118n at earlier levels. As illustrated, each of the first-N decision tree models 118a-118n may have a different structures to process data differently from one another. Pseudocode I to generate the first-N decision tree models 118a-118n in accordance with embodiments herein is provided below:

---

Pseudocode I

---

```
MCEAD (Memory and Compute-Efficient Anomaly Detector)
     Inputs:    Training data - X.train (N.train×D, where N.train: Training data sample size.
                D: Data feature size)
                Test data - X.test (N.test×D, where N.test: Test/inference data sample size)
     Inputs:    Configuration parameters:
                Bin_select- percentage of bin array selected for anomaly detection
                optimization
                Tree_Num - Tree number used in model
                SubSample_size - Sub-sampling size used in model
                Tree_depth_Limit- Tree depth limit to stop tree building
     Training data preprocessing procedure:
       for i in range (D):
                bin_array_opt[i], bin_count[i] = Optimal_Data_Quantization(X.train[:,i]) [4]
                if Bin_select < 100%:
                select_bin_array_opt[i] with the (Bin_select%) lowest bin_count value
     MCEAD model training procedure:
       for i in range(Tree_Num):
                Randomly subsample X.i from X.train with sub-sampling size
                (SubSample_size)
                Tree[i] ← Build_Tree(X.i, bin_array_opt, Tree_Depth_Lim)
                Trained Model ← Trained Model ∪Tree[i]
     Return:    Trained Model created from training data X.train
     Define Build_Tree( ):
       Start with a root node
       if (Tree_Depth_Lim is reached) or (Data point is isolated in the node):
                Set this node as an external node
                if Node.n (# of data point in this node) > 1:
                  Assign Node.weight with C(Node.n) (default of Node_weight = 0)
                  else:        Randomly select one feature from feature space (D)
                               Filter bin_array_opt within the range of X.i in the selected
                               feature → bin_array_opt_select
                               if bin_array_opt_select != empty:
                                      Randomly select one item from bin_array_opt_select as
                                      split point
                                      Splitting the current node into its left and right child
                                      nodes
                               else:     Set this node as an external node and assign
                                         Node_weight (if Node_n >1)
       Recursively repeat the above steps until all internal nodes are split into external
       nodes
       Return a tree built - end of Build_Tree( )
```

--- has the highest bin count value of 25 of the bins 0-9, 30-39, 90-99 and 70-79. Thus, the fourth split point may be based on the value 71.

As such, the above example identifies the first randomly subsampled data 114a (e.g., a first group of randomly subsampled data comprising values 4, 32, 91 and 72) of the randomly subsampled data, selects first data (e.g., value 32) of the first randomly subsampled data 114a based on a rank of data intensities (e.g., 2, 5, 12 and 25) from the second dataset 106 based on the first randomly subsampled data 114a, and establishes a split point (e.g., one of root node-fourth node) in the first decision tree model 118a of the decision tree models 118 based on the first data. The data intensities are bin count values (e.g., 2, 5, 12 and 25) associated with the first randomly subsampled data 114a.

The second decision tree model 118b-N decision tree model 118n are generated respectively on the second randomly subsampled data 114b-N randomly subsampled data 114n. For example, the second dataset 106 is accessed to identify values of the second randomly subsampled data A configuration parameter (e.g., Bin_select) may be introduced in Pseudocode I to denote the percentage of subset selection.

As noted, the randomly sub sampled data 114 may be generated through an optimal data quantization process that generates the second dataset 106 comprising a histogram summarizing the first dataset 102 into meaningful segments (i.e., discrete bins). Doing so simultaneously ensures a reasonably large bin width while preserving inherent data distribution of the first dataset 102, thus enabling a meaningful summarization of the first dataset 102 for anomaly detection modeling. The quantization process reduces the search space, thus accelerating the training time, reducing power and reducing resources to generate the decision tree models 118. Moreover, the data quantization process leads to building of significantly condensed decision tree models 118 (e.g., shorter tree depths with less leaf nodes) compared to other designs. Furthermore, since the optimal data quantization approximates data distribution intensity, the data quantization process preserves the comparative performance of anomaly detection. Thus, embodiments have smaller memory footprint requirements with reduced training and inference latency while minimizing performance impact.

Embodiments herein are able to meet the increasingly data-centric computing requirements in which optimized semiconductors accelerate and meet growing demand for data processing (e.g., anomaly detection) in various architectures (e.g., edge devices). Embodiments herein meet performance-related factors (e.g., dependability, security, reliability, and availability) for edge devices.

Anomaly detection based telemetry is a technique to address performance challenges on edge devices. Other telemetry designs may rely on cloud computing for machine learning training but may not be suitable for specific performance-related use cases due to latency restrictions, data privacy/security requirements and inability to transmit certain data to a centralized cloud. For example, while cloud-based training may handle population-level analysis, local-level analysis requires a detailed and personalized approach. For example, the decision tree models 118 should be tailored for each individual edge device based on the characteristics of the edge device such as in-field silicon failure process or safety risks). Moreover, throughout the silicon lifetime, embodiments may also recurrently re-train decision tree models 118 to adapt to the dynamic change of profiles. Therefore, some embodiments perform both model training and inference, with compute and memory efficiency, for anomaly detection on edge devices.

Figure 2:
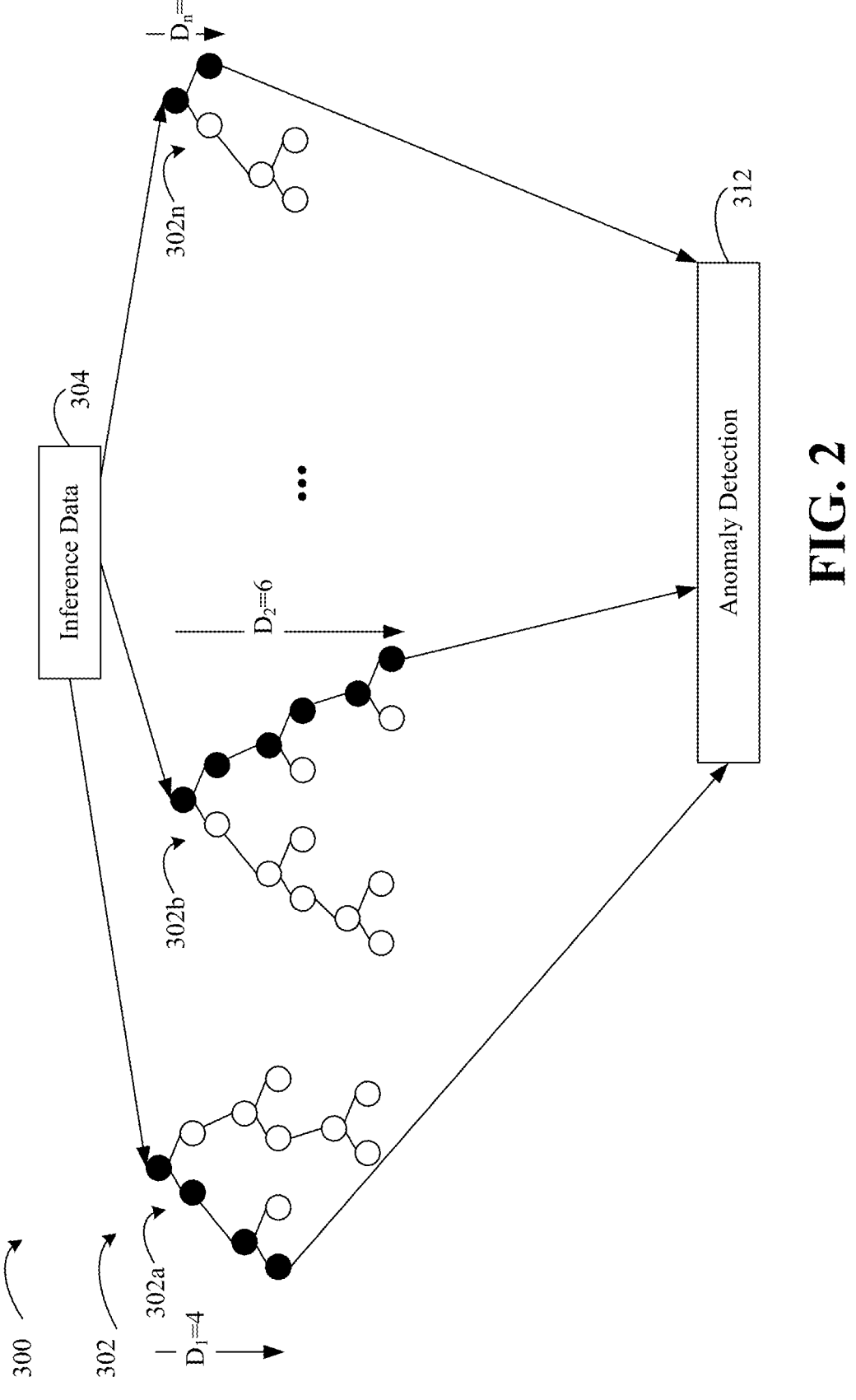
FIG. 2 is a process of an example of an unsupervised inference process according to an embodiment.

FIG. 2 illustrates an unsupervised inference process 300 that executes inference with decision tree models 302. The decision tree models 302 may be generated by process 100

The anomaly score of the test instance is calculated from the distances $D_1$-$D_n$ (e.g., path lengths) in all decision tree models 302. That is, the distances $D_1$-$D_n$ are averaged together to form an average distance which is compared to a threshold to determine whether an anomaly exists.

Anomaly data is expected to be located in sparse regions. That is, anomalies are a minority of all data and will have shorter distances than normal data. Anomalies may have attributes that are very different from normal data, and thus the tree branches containing anomalous data are usually less deep in the decision tree models 302. Thus, anomalous data has noticeably shorter distances. As such, some embodiments calculate the average of all the distances $D_1$-$D_n$ and compare the average distance to the threshold. If the average distance is below the threshold, the inference data 304 is classified as anomalous (e.g., the average distance is sufficiently small to merit an anomalous identification). If the average distance is above the threshold, the inference data 304 is classified as normal (e.g., the average distance is sufficiently large to merit a normal identification). Thus, the unsupervised inference process 300 performs anomaly detection in an unsupervised manner.

In this example, the average distance is below the threshold and therefore the inference data 304 is classified as anomalous, and the unsupervised inference process 300 outputs an anomaly detection 312. The anomaly detection 312 may provide an instruction to cease an operation based on the anomaly or notify an operator.

Pseudocode II to execute inference training based on unsupervised inference process 300 and in accordance with embodiments herein is provided below, and operates in conjunction with Pseudocode I (e.g., receives data from Pseudocode I):

---

Pseudocode II

---

MCEAD model testing/inference procedure:
    for each test data instance $X_{\cdot_{test}}[\ ]$ in $X_{\cdot_{test}}$
      for i in range(Tree_Num):
      $h(X_{\cdot_{test}}[\ ])$ (tree depth of test data $X_{\cdot_{test}}[\ ]$ traversed to reach one external
      node) + Node_weight
      Average over all trees in QiF: $E\_h \leftarrow$ average of $h(X_{\cdot_{test}}[\ ])$
      Anomaly score of $X_{\cdot_{test}}[\ ] = 2^{-E\_h/C(Sub\_Sample\_size)}$ [3]
    Define: C(N): Average path length of unsuccessful search in a binary search tree given N
    points to approximate the average tree depth
    $C(N) = 2(\ln(N-1)+0.5772156649) - (2(N-1)/N)$

--- and correspond to the decision tree models 118. The decision tree models 302 include first-N decision tree models 302a-302n.

The decision tree models 302 process inference data 304. For example, embodiments evaluate the inference data 304 by processing the inference data 304 with each of the first-N decision tree models 302a-302n to categorize the inference data 304 into a particular classification (e.g., bin). Path lengths are calculated from the root node to one leaf node as the inference data 304 traverses through a respective tree of the first-N decision tree models 302a-302n. For example, in the first decision tree model 302a the distance $D_1$ is 4. That is, the inference data 304 traverses through black nodes (e.g., is classified into the black nodes) of the first decision tree model 302a. In the second decision tree model 302b the distance $D_2$ is 6. That is, the inference data 304 traverses through black nodes (e.g., is classified into the black nodes) of the second decision tree model 302b. In the N decision tree model 302n the distance $D_n$ is 2. That is, the inference data 304 traverses through black nodes (e.g., is classified into the black nodes) of the N decision tree model 302n.

The unsupervised inference process 300 may execute on devices with limited compute and memory resources (e.g., edge devices) given the efficiency of the decision tree models 302 and the consensus approach described herein. The size of the decision tree models 302 may be more condensed than other approaches leading to reduced compute and memory resources. As such, embodiments herein facilitate anomaly detection in devices that may previously have been unable to do so in practical manner.

FIG. 3 shows a method 320 of training a plurality of decision tree models for according to embodiments herein. The method 320 may generally be implemented with the embodiments described herein, for example, the unsupervised anomaly detection training process 100 (FIG. 1) and the unsupervised inference process 300 (FIG. 2), already discussed. More particularly, the method 320 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 320 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 322 identifies a first dataset that comprises a plurality of data values. Illustrated processing block 324 partitions the first dataset into a plurality of bins to obtain a second dataset, where the second dataset is a compressed version of the first dataset. Illustrated processing block 326 randomly subsamples data associated with the first dataset to generate groups of randomly subsampled data. Illustrated processing block 328 generates a plurality of decision tree models during an unsupervised learning process based on the groups of randomly sub sampled data and the second dataset.

In some embodiments, method 320 includes identifying a first group of randomly subsampled data of the groups of randomly subsampled data, identifying a rank of data intensities from the second dataset based on the first group of randomly subsampled data, selecting first data of the first group of randomly subsampled data based on the rank of data intensities, and establishing a split point in a first decision tree model of the plurality of decision tree models based on the first data. The rank of data intensities is based on bin count values identified from the second dataset and that are associated with the first group of randomly subsampled data. The first dataset includes process values associated with physical machinery.

In some embodiments, the method 320 further includes identifying a first group of data from the randomly subsampled data, where the first group of data is associated with a plurality of bin count values from the second dataset, identifying that that first data of the first group of data is associated with a first bin count value of the plurality of bin count values, identifying that second data of the first group of data is associated with a second bin count value of the plurality of bin count values, where the second bin count value is greater than the first bin count value and bypassing the second data and selecting the first data for an establishment of a split point in a first decision tree model of the plurality of decision tree models based on the second bin count value being greater than the first bin count value.

In some embodiments, the method 320 includes inference processing. For example, the method 320 includes executing with the plurality of decision tree models an inference process on inference data to generate anomaly estimations and determining whether the inference data is an anomaly based on the anomaly estimations. The anomaly estimations are path lengths associated with a classification of the inference data with the plurality of decision tree models during the inference process. The method 320 further includes determining whether the inference data is the anomaly. The method 320 may further include averaging the path lengths to generate an average path length, determining that the inference data is the anomaly in response to the average path length being below a threshold and determining that the inference data is not the anomaly in response to the average path length meeting the threshold.

Thus, the method 320 may result in compressed decision tree models that are efficiently used for inference processing. The method 320 may result in lower memory and lower compute resource requirements while also detecting anomalies in a low-latency manner. The method 320 may be implemented in edge devices.

FIG. 4 shows a method 400 of generating decision trees. The method 400 may generally be implemented with the embodiments described herein, for example, the unsupervised anomaly detection training process 100 (FIG. 1), the unsupervised inference process 300 (FIG. 2) and the method 320 (FIG. 3), already discussed. The method 400 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 402 quantizes sample data to generate quantized data (e.g., transforms the data to a histogram format which compresses the data into a series of bins and bin count values). Illustrated processing block 404 randomly subsamples the sample data. Illustrated processing block 406 recursively splits the randomly subsampled sample data at selected partition points to generate a decision tree based on the quantized data (e.g., generate nodes to classify data). Illustrated processing block 408 determines if the generation of decision trees is completed. If not, processing block 404 executes. Otherwise, the method 400 may end.

FIG. 5 shows a method 420 of executing inference with a plurality of decision trees. The 420 may generally be implemented with the embodiments described herein, for example, the unsupervised anomaly detection training process 100 (FIG. 1), the unsupervised inference process 300 (FIG. 2), the method 320 (FIG. 3) and the method 400 (FIG. 4), already discussed.

The method 420 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 422 receives inference data. Illustrated processing block 424 processes inference data with decision trees. Processing block 424 involves generating a metric that quantifies an anomalous measurement (e.g., distance) of the inference data. Illustrated processing block 426 generates an anomaly score based on the processing of inference data (e.g., an average of the metrics for the decision trees). Illustrated processing block 428 determines if the anomaly score is below a threshold. If so, illustrated processing block 432 detects an anomaly. Otherwise, illustrated processing block 430 identifies that an anomaly is not detected.

Figure 6:
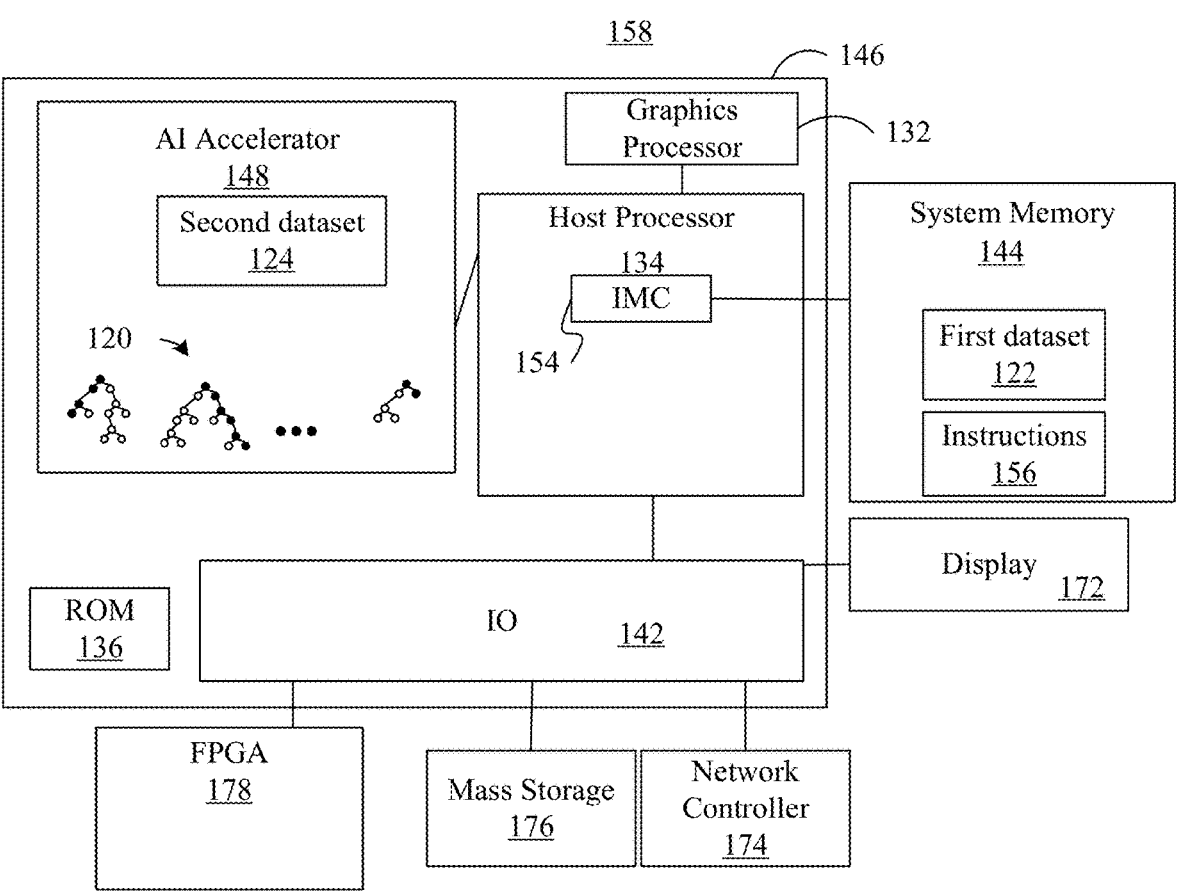
FIG. 6 is a block diagram of an example of an efficiency-enhanced and performance-enhanced training and inference computing system according to an embodiment.

Turning now to FIG. 6, an efficiency-enhanced and performance-enhanced training and inference computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), edge device (e.g., mobile phone, desktop, etc.) etc., or any combination thereof. In the illustrated example, the computing system 158 includes a host processor 134 (e.g., CPU) having an integrated memory controller (IMC) 154 that is coupled to a system memory 144.

The illustrated computing system 158 also includes an input output (IO) module 142 implemented together with the host processor 134, the graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). The SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as AI accelerator 148, etc. In some embodiments, any aspect of the embodiments described herein may be implemented in the processors, such as the graphics processor 132 and/or the host processor 134, and in the accelerators dedicated to AI and/or NN processing such as AI accelerator 148 or other devices such as the FPGA 178.

The graphics processor 132, AI accelerator 148 and/or the host processor 134 may execute instructions 156 retrieved from the system memory 144 (e.g., a dynamic random-access memory) and/or the mass storage 176 to implement aspects as described herein. For example, the AI accelerator 148 may retrieve a first dataset 122 from the system memory 144. The first dataset 122 comprises a plurality of data values. The first dataset 122 is partitioned into a plurality of bins to generate a second dataset 124, where the second dataset 124 is a compressed version (e.g., histogram) of the first dataset 122. The AI accelerator 148 may randomly subsample data associated with the first dataset 122 to generate groups of randomly subsampled data, and generate a plurality of decision tree models 120 during an unsupervised learning process based on the groups of randomly subsampled data and the second dataset 124. The AI accelerator 148 may also execute with the plurality of decision tree models 120 an inference process on inference data to generate anomaly estimations (e.g., distances shown in black for classifying the inference data) and determine whether the inference data is an anomaly based on the anomaly estimations. The anomaly estimations are path lengths associated with a classification of the inference data with the plurality of decision tree models 120 during the inference process. The AI accelerator 148 may also average the path lengths to generate an average path length, determine that the inference data is the anomaly in response to the average path length being below a threshold, and determine that the inference data is not the anomaly in response to the average path length meeting the threshold.

When the instructions 156 are executed, the computing system 158 may implement one or more aspects of the embodiments described herein. For example, the computing system 158 may implement one or more aspects of the unsupervised training and inference aspects described herein with respect to the unsupervised anomaly detection training process 100 (FIG. 1), the unsupervised inference process 300 (FIG. 2), the method 320 (FIG. 3), the method 400 (FIG. 4) and the method 420 (FIG. 5), already discussed. The illustrated computing system 158 is therefore considered to be an efficiency-enhanced and performance-enhanced at least to the extent that the computing system 158 reduces latency during training, reduces memory needed to store the plurality of decision tree models 120 and reduces compute requirements to train and execute inference.

Figure 7:
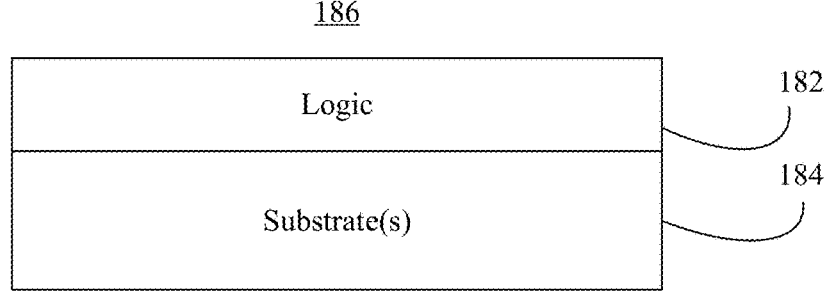
FIG. 7 is an illustration of an example of a semiconductor apparatus according to an embodiment.

FIG. 7 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, The apparatus 186 may generally implement the embodiments described herein, for example, the unsupervised anomaly detection training process 100 (FIG. 1), the unsupervised inference process 300 (FIG. 2), the method 320 (FIG. 3), the method 400 (FIG. 4) and the method 420 (FIG. 5), already discussed. The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 8:
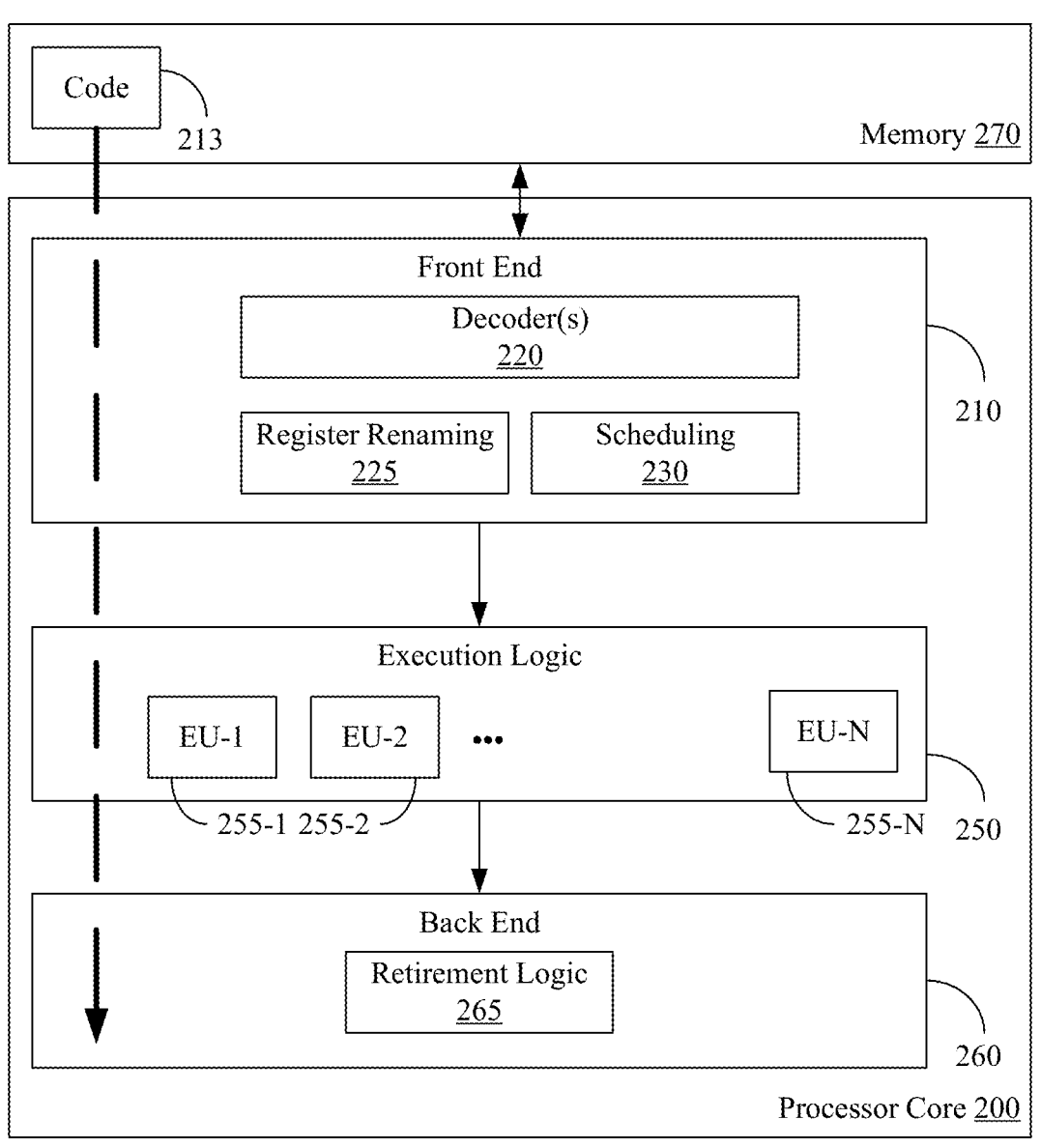
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the unsupervised anomaly detection training process 100 (FIG. 1), the unsupervised inference process 300 (FIG. 2), the method 320 (FIG. 3), the method 400 (FIG. 4) and the method 420 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include several execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back-end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
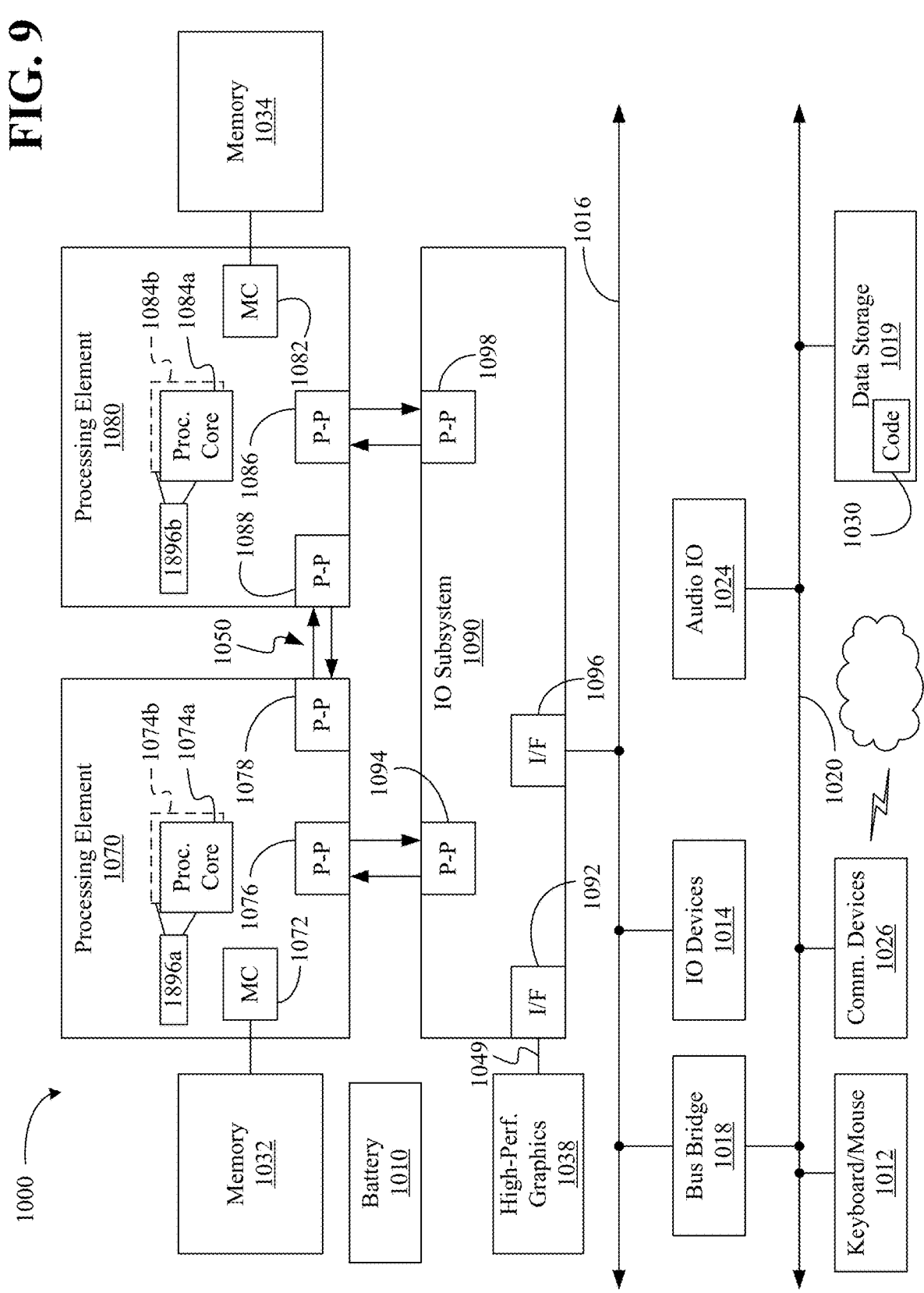
FIG. 9 is a block diagram of an example of a multiprocessor based computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood any or all the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner like that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an IO subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the unsupervised anomaly detection training process 100 (FIG. 1), the unsupervised inference process 300 (FIG. 2), the method 320 (FIG. 3), the method 400 (FIG. 4) and the method 420 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes a computing system comprising a host processor, a hardware accelerator coupled to the host processor, and a memory coupled to the hardware accelerator and the host processor, the memory including a set of executable program instructions, which when executed by one or more of the host processor or the hardware accelerator, cause the computing system to identify a first dataset that comprises a plurality of data values, partition the first dataset into a plurality of bins to generate a second dataset, wherein the second dataset is a compressed version of the first dataset, randomly subsample data associated with the first dataset to obtain groups of randomly subsampled data, and generate a plurality of decision tree models during an unsupervised learning process based on the groups of randomly sub sampled data and the second dataset.

Example 2 includes the computing system of example 1, wherein the executable program instructions, when executed, cause the computing system to identify a first group of randomly subsampled data of the groups of randomly subsampled data, identify a rank of data intensities from the second dataset based on the first group of randomly subsampled data, select first data of the first group of randomly subsampled data based on the rank of data intensities, and establish a split point in a first decision tree model of the plurality of decision tree models based on the first data.

Example 3 includes the computing system of example 2, wherein the data intensities are bin count values identified from the second dataset, wherein the bin count values are associated with the first group of randomly sub sampled data, and the first dataset includes process values associated with physical machinery.

Example 4 includes the computing system of any one of examples 1-3, wherein the executable program instructions, when executed, cause the computing system to identify a first group of data from the groups of randomly subsampled data, wherein the first group of data is associated with a plurality of bin count values from the second dataset, identify that that first data of the first group of data is associated with a first bin count value of the plurality of bin count values, identify that second data of the first group of data is associated with a second bin count value of the plurality of bin count values, wherein the second bin count value is greater than the first bin count value, and bypass the second data and select the first data for an establishment of a split point in a first decision tree model of the plurality of decision tree models based on the second bin count value being greater than the first bin count value.

Example 5 includes the computing system of any one of examples 1-4, wherein the executable program instructions, when executed, cause the computing system to execute, with the plurality of decision tree models, an inference process on inference data to generate anomaly estimations, and determine whether the inference data is an anomaly based on the anomaly estimations.

Example 6 includes the computing system of example 5, wherein the anomaly estimations are path lengths associated with a classification of the inference data with the plurality of decision tree models during the inference process, further wherein to determine whether the inference data is the anomaly, the executable program instructions, when executed, further cause the computing system to average the path lengths to generate an average path length, determine that the inference data is the anomaly in response to the average path length being below a threshold, and determine that the inference data is not the anomaly in response to the average path length meeting the threshold.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to identify a first dataset that comprises a plurality of data values, partition the first dataset into a plurality of bins to generate a second dataset, wherein the second dataset is a compressed version of the first dataset, randomly subsample data associated with the first dataset to obtain groups of randomly subsampled data, and generate a plurality of decision tree models during an unsupervised learning process based on the groups of randomly subsampled data and the second dataset.

Example 8 includes the apparatus of example 7, wherein the logic coupled to the one or more substrates is to identify a first group of randomly subsampled data of the groups of randomly subsampled data, identify a rank of data intensities from the second dataset based on the first group of randomly subsampled data, select first data of the first group of randomly subsampled data based on the rank of data intensities, and establish a split point in a first decision tree model of the plurality of decision tree models based on the first data.

Example 9 includes the apparatus of example 8, wherein the data intensities are bin count values identified from the second dataset, wherein the bin count values are associated with the first group of randomly subsampled data, and the first dataset includes process values associated with physical machinery.

Example 10 includes the apparatus of example 7, wherein the logic coupled to the one or more substrates is to identify a first group of data from the groups of randomly subsampled data, wherein the first group of data is associated with a plurality of bin count values from the second dataset, identify that that first data of the first group of data is associated with a first bin count value of the plurality of bin count values, identify that second data of the first group of data is associated with a second bin count value of the plurality of bin count values, wherein the second bin count value is greater than the first bin count value, and bypass the second data and select the first data for an establishment of a split point in a first decision tree model of the plurality of decision tree models based on the second bin count value being greater than the first bin count value.

Example 11 includes the apparatus of example 7, wherein the logic coupled to the one or more substrates is to execute, with the plurality of decision tree models, an inference process on inference data to generate anomaly estimations, and determine whether the inference data is an anomaly based on the anomaly estimations.

Example 12 includes the apparatus of example 11, wherein the anomaly estimations are path lengths associated with a classification of the inference data with the plurality of decision tree models during the inference process, further wherein to determine whether the inference data is the anomaly, the logic coupled to the one or more substrates is to average the path lengths to generate an average path length, determine that the inference data is the anomaly in response to the average path length being below a threshold, and determine that the inference data is not the anomaly in response to the average path length meeting the threshold.

Example 13 includes the apparatus of example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to identify a first dataset that comprises a plurality of data values, partition the first dataset into a plurality of bins to generate a second dataset, wherein the second dataset is a compressed version of the first dataset, randomly subsample data associated with the first dataset to obtain groups of randomly subsampled data, and generate a plurality of decision tree models during an unsupervised learning process based on the groups of randomly sub sampled data and the second dataset.

Example 15 includes the at least one computer readable storage medium of example 14, wherein the instructions, when executed, further cause the computing system to identify a first group of randomly subsampled data of the groups of randomly subsampled data, identify a rank of data intensities from the second dataset based on the first group of randomly subsampled data, select first data of the first group of randomly subsampled data based on the rank of data intensities, and establish a split point in a first decision tree model of the plurality of decision tree models based on the first data.

Example 16 includes the at least one computer readable storage medium of example 15, wherein the data intensities are bin count values identified from the second dataset, wherein the bin count values are associated with the first group of randomly subsampled data, and the first dataset includes process values associated with physical machinery.

Example 17 includes the at least one computer readable storage medium of example 14, wherein the instructions, when executed, further cause the computing system to identify a first group of data from the groups of randomly subsampled data, wherein the first group of data is associated with a plurality of bin count values from the second dataset, identify that first data of the first group of data is associated with a first bin count value of the plurality of bin count values, identify that second data of the first group of data is associated with a second bin count value of the plurality of bin count values, wherein the second bin count value is greater than the first bin count value, and bypass the second data and select the first data for an establishment of a split point in a first decision tree model of the plurality of decision tree models based on the second bin count value being greater than the first bin count value.

Example 18 includes the at least one computer readable storage medium of example 14, wherein the instructions, when executed, further cause the computing system to execute, with the plurality of decision tree models, an inference process on inference data to generate anomaly estimations, and determine whether the inference data is an anomaly based on the anomaly estimations.

Example 19 includes the at least one computer readable storage medium of example 18, wherein the anomaly estimations are path lengths associated with a classification of the inference data with the plurality of decision tree models during the inference process, wherein the instructions, when executed, further cause the computing system to average the path lengths to generate an average path length, determine that the inference data is the anomaly in response to the average path length being below a threshold, and determine that the inference data is not the anomaly in response to the average path length meeting the threshold.

Example 20 includes a method comprising identifying a first dataset that comprises a plurality of data values, partitioning the first dataset into a plurality of bins to generate a second dataset, wherein the second dataset is a compressed version of the first dataset, randomly subsampling data associated with the first dataset to obtain groups of randomly subsampled data, and generating a plurality of decision tree models during an unsupervised learning process based on the groups of randomly subsampled data and the second dataset.

Example 21 includes the method of example 20, further comprising identifying a first group of randomly subsampled data of the groups of randomly subsampled data, identifying a rank of data intensities from the second dataset based on the first group of randomly subsampled data, selecting first data of the first group of randomly subsampled data based on a rank of data intensities, and establishing a split point in a first decision tree model of the plurality of decision tree models based on the first data.

Example 22 includes the method of example 21, wherein the data intensities are bin count values identified from the second dataset, wherein the bin count values are associated with the first group of randomly subsampled data, and the first dataset includes process values associated with physical machinery.

Example 23 includes the method of example 20, wherein the method further comprises identifying a first group of data from the groups of randomly subsampled data, wherein the first group of data is associated with a plurality of bin count values from the second dataset, identifying that that first data of the first group of data is associated with a first bin count value of the plurality of bin count values, identifying that second data of the first group of data is associated with a second bin count value of the plurality of bin count values, wherein the second bin count value is greater than the first bin count value, and bypassing the second data and selecting the first data for an establishment of a split point in a first decision tree model of the plurality of decision tree models based on the second bin count value being greater than the first bin count value.

Example 24 includes the method of example 20, further comprising executing, with the plurality of decision tree models, an inference process on inference data to generate anomaly estimations, and determining whether the inference data is an anomaly based on the anomaly estimations.

Example 25 includes the method of example 24, wherein the anomaly estimations are path lengths associated with a classification of the inference data with the plurality of decision tree models during the inference process, further wherein the determining whether the inference data is the anomaly comprises averaging the path lengths to generate an average path length, determining that the inference data is the anomaly in response to the average path length being below a threshold, and determining that the inference data is not the anomaly in response to the average path length meeting the threshold.

Example 26 includes a semiconductor apparatus comprising means for identifying a first dataset that comprises a plurality of data values, means for partitioning the first dataset into a plurality of bins to generate a second dataset, wherein the second dataset is to be a compressed version of the first dataset, means for randomly subsampling data associated with the first dataset to obtain groups of randomly subsampled data, and means for generating a plurality of decision tree models during an unsupervised learning process based on the groups of randomly subsampled data and the second dataset.

Example 27 includes the apparatus of example 26, further comprising means for identifying a first group of randomly subsampled data of the groups of randomly subsampled data, means for identifying a rank of data intensities from the second dataset based on the first group of randomly subsampled data, means for selecting first data of the first group of randomly subsampled data based on the rank of data intensities, and means for establishing a split point in a first decision tree model of the plurality of decision tree models based on the first data.

Example 28 includes the apparatus of example 27, wherein the data intensities are bin count values identified from the second dataset, wherein the bin count values are associated with the first group of randomly subsampled data, and the first dataset includes process values associated with physical machinery.

Example 29 includes the apparatus of any one of examples 26-28, wherein the method further comprises means for identifying a first group of data from the groups of randomly sub sampled data, wherein the first group of data is associated with a plurality of bin count values from the second dataset, means for identifying that that first data of the first group of data is associated with a first bin count value of the plurality of bin count values, means for identifying that second data of the first group of data is associated with a second bin count value of the plurality of bin count values, wherein the second bin count value is greater than the first bin count value, and means for bypassing the second data and selecting the first data for an establishment of a split point in a first decision tree model of the plurality of decision tree models based on the second bin count value being greater than the first bin count value.

Example 30 includes the apparatus of any one of examples 26-29, further comprising means for executing, with the plurality of decision tree models, an inference process on inference data to generate anomaly estimations, and means for determining whether the inference data is an anomaly based on the anomaly estimations.

Example 31 includes the apparatus of example 30, wherein the anomaly estimations are path lengths associated with a classification of the inference data with the plurality of decision tree models during the inference process, further wherein the means for determining whether the inference data is the anomaly comprises means for averaging the path lengths to generate an average path length, means for determining that the inference data is the anomaly in response to the average path length being below a threshold, and means for determining that the inference data is not the anomaly in response to the average path length meeting the threshold.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a host processor;
a hardware accelerator coupled to the host processor; and
a memory coupled to the hardware accelerator and the host processor, the memory including a set of executable program instructions, which when executed by one or more of the host processor or the hardware accelerator, cause the computing system to:
   identify a first dataset that comprises a plurality of data values,
   partition the first dataset into a plurality of bins to generate a second dataset, wherein the second dataset is a compressed version of the first dataset,
   randomly subsample data associated with the first dataset to obtain groups of randomly subsampled data,
   identify a first group of data from the groups of randomly subsampled data, wherein the first group of data is associated with a plurality of bin count values from the second dataset,
   identify that that first data of the first group of data is associated with a first bin count value of the plurality of bin count values,
   identify that second data of the first group of data is associated with a second bin count value of the plurality of bin count values, wherein the second bin count value is greater than the first bin count value, and
   bypass the second data and select the first data for an establishment of a split point in a first decision tree model of the plurality of decision tree models based on the second bin count value being greater than the first bin count value, and
   generate a plurality of decision tree models during an unsupervised learning process based on the groups of randomly subsampled data and the second dataset.

2. The computing system of claim 1, wherein the executable program instructions, when executed, cause the computing system to:
   identify a first group of randomly subsampled data of the groups of randomly subsampled data;
   identify a rank of data intensities from the second dataset based on the first group of randomly subsampled data;
   select first data of the first group of randomly sub sampled data based on the rank of data intensities; and
   establish a split point in a first decision tree model of the plurality of decision tree models based on the first data.

3. The computing system of claim 2, wherein:
   the data intensities are bin count values identified from the second dataset, wherein the bin count values are associated with the first group of randomly subsampled data; and
   the first dataset includes process values associated with physical machinery.

4. The computing system of claim 1, wherein the executable program instructions, when executed, cause the computing system to:

21 execute, with the plurality of decision tree models, an inference process on inference data to generate anomaly estimations; and
determine whether the inference data is an anomaly based on the anomaly estimations.

5. The computing system of claim 4, wherein the anomaly estimations are path lengths associated with a classification of the inference data with the plurality of decision tree models during the inference process, further wherein to determine whether the inference data is the anomaly, the executable program instructions, when executed, further cause the computing system to:
   average the path lengths to generate an average path length;
   determine that the inference data is the anomaly in response to the average path length being below a threshold; and
   determine that the inference data is not the anomaly in response to the average path length meeting the threshold.

6. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
   identify a first dataset that comprises a plurality of data values,
   partition the first dataset into a plurality of bins to generate a second dataset, wherein the second dataset is a compressed version of the first dataset,
   randomly subsample data associated with the first dataset to obtain groups of randomly subsampled data,
   identify a first group of data from the groups of randomly subsampled data, wherein the first group of data is associated with a plurality of bin count values from the second dataset,
   identify that that first data of the first group of data is associated with a first bin count value of the plurality of bin count values,
   identify that second data of the first group of data is associated with a second bin count value of the plurality of bin count values, wherein the second bin count value is greater than the first bin count value,
   bypass the second data and select the first data for an establishment of a split point in a first decision tree model of the plurality of decision tree models based on the second bin count value being greater than the first bin count value, and
   generate a plurality of decision tree models during an unsupervised learning process based on the groups of randomly subsampled data and the second dataset.

7. The apparatus of claim 6, wherein the logic coupled to the one or more substrates is to:
   identify a first group of randomly subsampled data of the groups of randomly subsampled data;
   identify a rank of data intensities from the second dataset based on the first group of randomly subsampled data;
   select first data of the first group of randomly subsampled data based on the rank of data intensities; and
   establish a split point in a first decision tree model of the plurality of decision tree models based on the first data.

8. The apparatus of claim 7, wherein:
   the data intensities are bin count values identified from the second dataset, wherein the bin count values are associated with the first group of randomly subsampled data; and the first dataset includes process values associated with physical machinery.

9. The apparatus of claim 6, wherein the logic coupled to the one or more substrates is to:

execute, with the plurality of decision tree models, an inference process on inference data to generate anomaly estimations; and determine whether the inference data is an anomaly based on the anomaly estimations.

10. The apparatus of claim 9, wherein the anomaly estimations are path lengths associated with a classification of the inference data with the plurality of decision tree models during the inference process, further wherein to determine whether the inference data is the anomaly, the logic coupled to the one or more substrates is to:

average the path lengths to generate an average path length;

determine that the inference data is the anomaly in response to the average path length being below a threshold; and determine that the inference data is not the anomaly in response to the average path length meeting the threshold.

11. The apparatus of claim 6, wherein the logic coupled to the one or more substrates includes transistor channel regions that are positioned within the one or more substrates.

12. At least one non-transitory computer readable storage medium comprising a set of executable program instructions, which when executed by a computing system, cause the computing system to:

identify a first dataset that comprises a plurality of data values;

partition the first dataset into a plurality of bins to generate a second dataset, wherein the second dataset is a compressed version of the first dataset;

randomly subsample data associated with the first dataset to obtain groups of randomly subsampled data;

identify a first group of data from the groups of randomly subsampled data, wherein the first group of data is associated with a plurality of bin count values from the second dataset;

identify that first data of the first group of data is associated with a first bin count value of the plurality of bin count values;

identify that second data of the first group of data is associated with a second bin count value of the plurality of bin count values, wherein the second bin count value is greater than the first bin count value; and bypass the second data and select the first data for an establishment of a split point in a first decision tree model of the plurality of decision tree models based on the second bin count value being greater than the first bin count value; and generate a plurality of decision tree models during an unsupervised learning process based on the groups of randomly subsampled data and the second dataset.

13. The at least one non-transitory computer readable storage medium of claim 12, wherein the instructions, when executed, further cause the computing system to:

identify a first group of randomly subsampled data of the groups of randomly subsampled data;

identify a rank of data intensities from the second dataset based on the first group of randomly subsampled data;

select first data of the first group of randomly subsampled data based on the rank of data intensities; and establish a split point in a first decision tree model of the plurality of decision tree models based on the first data.

14. The at least one non-transitory computer readable storage medium of claim 13, wherein:

the data intensities are bin count values identified from the second dataset, wherein the bin count values are associated with the first group of randomly subsampled data; and the first dataset includes process values associated with physical machinery.

15. The at least one non-transitory computer readable storage medium of claim 12, wherein the instructions, when executed, further cause the computing system to:

execute, with the plurality of decision tree models, an inference process on inference data to generate anomaly estimations; and determine whether the inference data is an anomaly based on the anomaly estimations.

16. The at least one non-transitory computer readable storage medium of claim 15, wherein the anomaly estimations are path lengths associated with a classification of the inference data with the plurality of decision tree models during the inference process, wherein the instructions, when executed, further cause the computing system to:

average the path lengths to generate an average path length;

determine that the inference data is the anomaly in response to the average path length being below a threshold; and determine that the inference data is not the anomaly in response to the average path length meeting the threshold.

17. A method comprising:

identifying a first dataset that comprises a plurality of data values;

partitioning the first dataset into a plurality of bins to generate a second dataset, wherein the second dataset is a compressed version of the first dataset;

randomly subsampling data associated with the first dataset to obtain groups of randomly subsampled data;

identifying a first group of data from the groups of randomly subsampled data, wherein the first group of data is associated with a plurality of bin count values from the second dataset;

identifying that that first data of the first group of data is associated with a first bin count value of the plurality of bin count values;

identifying that second data of the first group of data is associated with a second bin count value of the plurality of bin count values, wherein the second bin count value is greater than the first bin count value;

bypassing the second data and selecting the first data for an establishment of a split point in a first decision tree model of the plurality of decision tree models based on the second bin count value being greater than the first bin count value; and generating a plurality of decision tree models during an unsupervised learning process based on the groups of randomly subsampled data and the second dataset.

18. The method of claim 17, further comprising:

identifying a first group of randomly subsampled data of the groups of randomly subsampled data;

identifying a rank of data intensities from the second dataset based on the first group of randomly subsampled data;

selecting first data of the first group of randomly subsampled data based on the rank of data intensities; and

25 establishing a split point in a first decision tree model of the plurality of decision tree models based on the first data.

19. The method of claim 18, wherein:

the data intensities are bin count values identified from the second dataset, wherein the bin count values are associated with the first group of randomly subsampled data; and the first dataset includes process values associated with physical machinery.

20. The method of claim 17, further comprising:

executing, with the plurality of decision tree models, an inference process on inference data to generate anomaly estimations; and determining whether the inference data is an anomaly based on the anomaly estimations.

21. The method of claim 20, wherein the anomaly estimations are path lengths associated with a classification of the inference data with the plurality of decision tree models during the inference process, further wherein the determining whether the inference data is the anomaly comprises:

averaging the path lengths to generate an average path length;

determining that the inference data is the anomaly in response to the average path length being below a threshold; and determining that the inference data is not the anomaly in response to the average path length meeting the threshold.

* * * * *

26